United States Patent [19]

Steidle et al.

[11] Patent Number: 5,753,993
[45] Date of Patent: May 19, 1998

[54] ADJUSTING APPARATUS FOR CARBON BRUSHES ON AN ELECTRIC MOTOR

[75] Inventors: Alfons Steidle; Alois Schaeffeler, both of Spaichingen, Germany

[73] Assignee: Marquardt GmbH, Rietheim-Weilheim, Germany

[21] Appl. No.: 758,940

[22] Filed: Dec. 3, 1996

[30] Foreign Application Priority Data

Dec. 7, 1995 [DE] Germany ............ 195 45 651.3

[51] Int. Cl.[6] .................. H01R 39/38; H01R 39/44; H02K 7/14; H02K 11/00
[52] U.S. Cl. .................. 310/239; 310/50; 310/68 A
[58] Field of Search .................. 310/68 A, 241, 310/239, 50, 47

[56] References Cited

U.S. PATENT DOCUMENTS

| 3,440,465 | 4/1969 | Pratt et al. ................ 310/241 |
| 4,587,384 | 5/1986 | Yacobi ................ 310/68 A |
| 4,748,353 | 5/1988 | Klingenstein et al. ........ 310/68 A |
| 5,196,747 | 3/1993 | Kress et al. ................ 310/68 A |

FOREIGN PATENT DOCUMENTS

| 0208137 | 1/1987 | European Pat. Off. . |
| 3731079 | 3/1989 | Germany . |
| 4004464A1 | 1/1991 | Germany . |
| 3943651 | 1/1993 | Germany . |
| 4004464C2 | 5/1993 | Germany . |
| 642006 | 8/1950 | United Kingdom . |

*Primary Examiner*—Clayton E. Laballe
*Attorney, Agent, or Firm*—Spencer & Frank

[57] ABSTRACT

An apparatus for adjusting carbon brushes of a reversible electric motor includes: a swivelable support; a fixed position contact plate disposed adjacent the support; a plurality of fixed contacts received in the contact plate and adapted to be electrically connected to field windings of the electric motor; and a plurality of brush holders arranged on the support for holding the carbon brushes, each of the brush holders having a facing surface which faces the contact plate. Each of the brush holders further includes a projecting portion projecting approximately perpendicularly from the facing surface in the axial direction into a region of the fixed contacts, projecting portions of the brush holders thereby forming switching contacts for making direct contact with the fixed contacts such that the fixed contacts are adapted to be in alternate contact with the carbon brushes for reversing a direction of rotation of the electric motor when the support is swiveled. Each of the fixed contacts has a contact surface extending approximately parallel to a corresponding switching contact in the axial direction, the contact surface further having elasticity the radial direction such that the corresponding switching contact is directly urged against the contact surface in the radial direction for establishing direct electrical contact between the fixed contacts and the brush holders.

13 Claims, 5 Drawing Sheets

ADJUSTING APPARATUS FOR CARBON BRUSHES ON AN ELECTRIC MOTOR

FIELD OF THE INVENTION

The invention relates to an apparatus for adjusting carbon brushes for a reversible electric motor.

BACKGROUND OF THE INVENTION

Electric hand-held tools, such as drills, screwdrivers or the like, are frequently designed for both clockwise and counterclockwise operation, an electric changeover switch for the polarity of the connections of the electric motor being arranged on the electric tool. In addition, the carbon brushes may be adjusted to the respectively optimum position during the changeover in the rotation direction, in order to improve the efficiency of the electric motor in both rotation directions.

EP-B-0 208 137 discloses an electric hand-held tool having a reversible electric motor on which an apparatus is arranged for adjusting the carbon brushes at the same time as the changeover in the rotation direction of the electric motor is made. This apparatus comprises a fixed-position contact plate, which is plugged onto the stator of the electric motor, and a support which, for its part, can be swiveled on the contact plate. The brush holders for the carbon brushes, which slide on the commutator of the electric motor, are attached to the support. The support is designed with a cavity in which switching contacts are arranged, which are electrically connected to the carbon brushes. The contact plate is used to hold fixed contacts which, in turn, are connected to the connections for the field windings of the electric motor. The fixed contacts have contact surfaces which interact with the switching contacts as mating contacts in alternate contact with the carbon brushes as a result of which the rotation direction of the electric motor is reversed when the support is swiveled.

It is disadvantageous in the case of the known apparatus for adjusting carbon brushes and for changing over the rotation direction of the electric motor that the switching and fixed contacts are of complex design. Furthermore, additional complexity is involved since a separate electrical connection is required between the carbon brushes and the switching contacts. This increases the production costs for the apparatus, and complicates its assembly. Furthermore, because of the additional electrical connections and the complex arrangement of the contacts, there is a high risk of incorrect switching operations and switching failures occurring. The known apparatus is therefore not functionally reliable.

The known apparatus cannot be completely preassembled. For example, the carbon brushes cannot be inserted until the apparatus is mounted on the electric motor. At the same time, assembly is complex because of the number of individual parts to be assembled at the same time. Subsequent replacement of the carbon brushes, which represent a part subject to wear of the electric motor, is possible only by disassembly and dismantling of the apparatus. In consequence, this apparatus is also not easy to maintain.

SUMMARY OF THE INVENTION

The invention is based on the object of refining an apparatus for adjusting the carbon brushes and for changing over the rotation direction of an electric motor in such a manner that the contact reliability and functional reliability are improved. In addition, it is intended to ensure that it is easier to mount the apparatus on the electric motor.

This object is achieved by providing an apparatus for adjusting carbon brushes of a reversible electric motor. The apparatus has an axial direction and a radial direction and comprises: a swivelable support; a fixed position contact plate disposed adjacent the support; a plurality of fixed contacts received in the contact plate and adapted to be electrically connected to field windings of the electric motor; and a plurality of brush holders arranged on the support for holding the carbon brushes, each of the brush holders having a facing surface which faces the contact plate. Each of the brush holders further includes a projecting portion projecting approximately perpendicularly from the facing surface in the axial direction into a region of the fixed contacts, projecting portions of the brush holders thereby forming switching contacts for making direct contact with the fixed contacts such that the fixed contacts are adapted to be in alternate contact with the carbon brushes for reversing a direction of rotation of the electric motor when the support is swiveled. Each of the fixed contacts has a contact surface extending approximately parallel to a corresponding switching contact in the axial direction, the contact surface further having elasticity the radial direction such that the corresponding switching contact is directly urged against the contact surface in the radial direction for establishing direct electrical contact between the fixed contacts and the brush holders.

The apparatus can be designed as a compact component, the component comprising a support and a contact plate which can be assembled by means of snap-on and/or guide hooks. In consequence, the contact system for the changeover switch is encapsulated by the component, so that particularly good dust protection can be achieved, as is required in particular for use in electric hand-held tools.

In a further version, the contact surfaces of the fixed contacts are designed as end sections, designed elastically, of contact strips. Two contact strips each having two contact surfaces are located in the apparatus, a contact web for electrical connection of the contact strip to the respective connection for the field windings projecting from the contact strip, approximately centrally between the contact surfaces. It is possible to design the contact strip, the contact web and the connection for the field winding as an integral stamped part. The contact strips can be located in a groove in the contact plate, which is arranged on the side facing the support.

In a development of the invention, that part of the free surface, facing the contact plate, of the brush holder which acts as a switching contact is designed to project from the free surface, it being possible for this part to be bent away integrally from the free surface. In consequence, the switching contact is approximately at right angles to the free surface and runs in the axial direction with respect to the electric motor. The fixed contacts are arranged to run in the axial direction in the groove, approximately parallel to the switching contact, the contact surfaces having elasticity in the radial direction. In consequence, the switching contacts interact with the contact surfaces of the fixed contacts in the radial direction in order to make contact.

It is possible to design the switch positions, which are adjustable during swiveling of the support by the interaction of the switching contacts and the fixed contacts, as latched positions. A latching curve is located in the contact plate and a latching spring, which is elastic in the axial direction, is located on the brush holder, for this purpose. The latching spring can be designed integrally with the free surface of the brush holder, for example as a stamped and bent part.

In order to ensure that it is possible to replace the carbon brushes easily, a chamber, which is open on both sides in the radial direction, can be integrally formed on the support in order to hold the brush holders. A retaining hook, which is integrally formed on the chamber and in turn engages in a recess on the brush holder like a snap-on element, is used to secure the brush holders in the chamber.

The carbon brushes can be held back in the brush holder by means of retaining elements arranged on the support, for transport security. At the same time, these retaining elements are used as an aid for mounting the apparatus on the electric motor, since it is now possible to plug said apparatus onto the electric motor without disturbing the carbon brushes. After the apparatus has been mounted, the retaining element can be removed, for example by being broken off.

It is furthermore advantageous if the connections for the field windings are exposed on that side of the contact plate which faces away from the support such that the electrical connection between the connections and the field windings can be made when the apparatus is fitted onto the stator of the electric motor. The connections can be designed in very different ways, for example as an insulation-piercing terminal, plug, wire connection, sleeve connection or the like.

In yet another version, a holder for a suppression inductor is arranged on that side of the contact plate which faces away from the support. Suppression inductors of different diameters can be held in the holder by means of a clip. The suppression inductors are plugged into clamping contacts, which are in turn electrically connected to the connections. In order to make it possible to produce the apparatus optionally with or without a suppression inductor, it is possible to disconnect the electrical connection bridging the clamping contacts, subsequently, by means of a cutting tool or the like.

The advantages achieved by the invention are, in particular, that the contact system for the changeover switch is of simple design and can thus be produced cost-effectively. Furthermore, the contact reliability is improved, so that the risk of failures is reduced and the functional reliability of the apparatus is increased.

The apparatus according to the invention is a compact component which can be completely preassembled. The component can be transported safely and, in particular, damage resulting from the carbon brushes jumping out during transport is effectively prevented. Furthermore, the component can be mounted on the electric motor easily just by plugging it on, resulting in a saving in assembly costs. Moreover, it is possible to replace the carbon brushes in a simple manner and without disassembling the electrical equipment, for maintenance purposes.

BRIEF DESCRIPTION OF THE DRAWINGS

Exemplary embodiments of the invention are described in more detail in the following text and are illustrated in the drawings, in which.

DETAILED DESCRIPTION OF THE INVENTION

Electric hand-held tools for mains operation, such as drills, screwdrivers or the like, as a rule have a universal motor as the electric motor, which is frequently designed for both clockwise and counterclockwise operation. The polarity of the connections for the electric motor has to be reversed in order to change over between clockwise and counterclockwise running. During such a changeover, it is possible at the same time to adjust the carbon brushes in the electric motor in order to align the carbon brushes in an optimum position on the commutator, with reference to the respective running direction. An apparatus according to the invention for adjusting the carbon brushes and having an integrated changeover switch for such a reversible electric motor can be seen in side view in FIG. 1, the electric motor being illustrated only schematically.

The apparatus is designed as a flat component 1, which can be fitted on the stator 4 of the electric motor in the axial direction 36. The component 1 is, for example, screwed, fixed with plug connecting parts 13 or secured in a similar manner for mounting on the stator 4. The component 1 surrounds the commutator 3 on the rotor 2 of the electric motor in the form of a ring in the radial direction 37.

Figure 4:
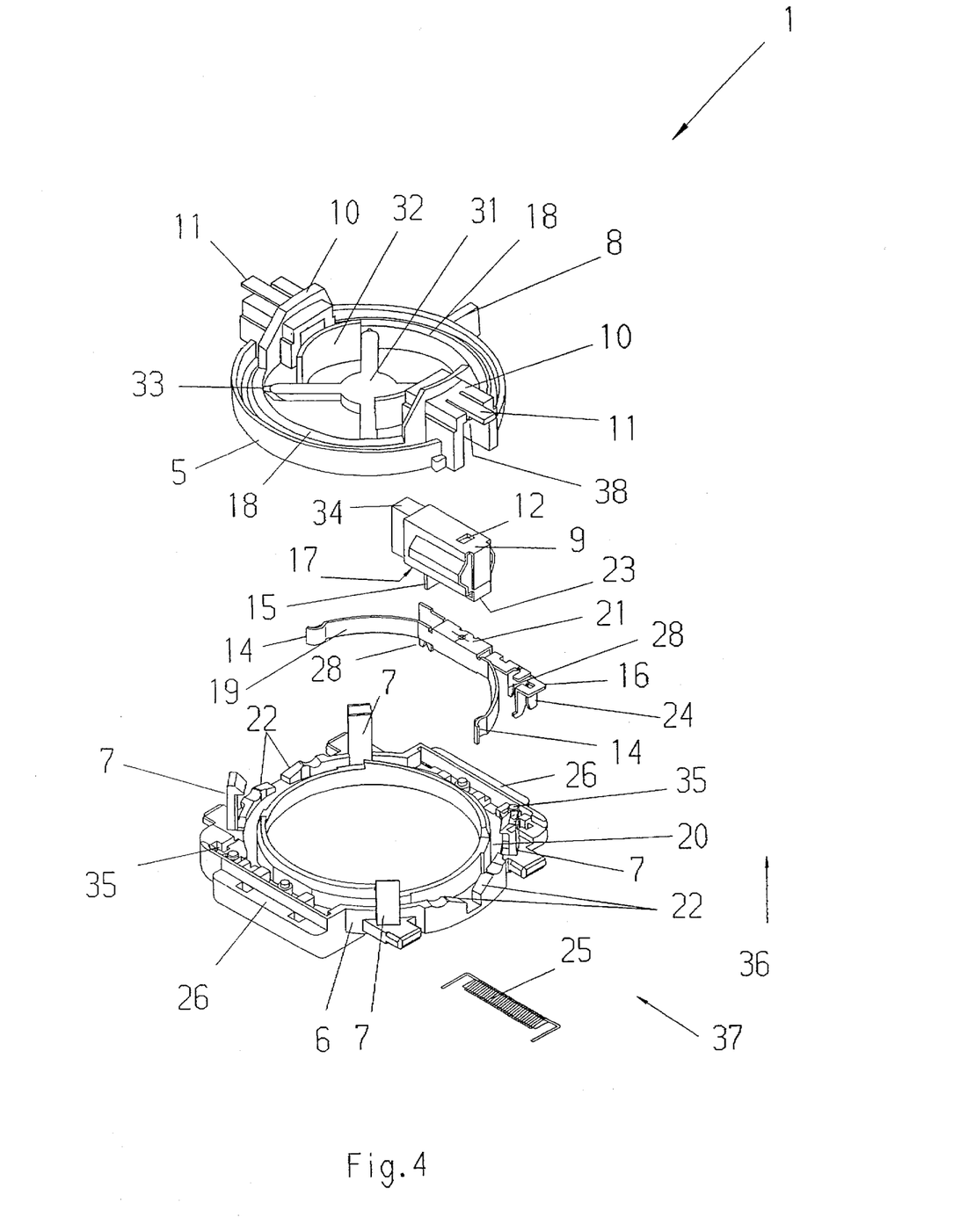
FIG. 4 shows an exploded illustration of the apparatus for adjusting carbon brushes.

The component 1 comprises a support 5 and a contact plate 6 as can be seen, in particular, in FIG. 4, in which the component 1 is shown in an exploded, perspective illustration. The support 5 and the contact plate 6 can be assembled to form the component 1 by means of snap-on hooks 7 or other guide hooks which project from the contact plate 6 in the axial direction 36. The snap-on hooks 7 can, of course, also be fitted in the opposite manner on the support 5. The support 5 can be swiveled on the contact plate 6 by means of a handle 8, while the contact plate 6 is secured in a fixed position on the stator 4 of the electric motor, as can be seen from FIG. 1.

The support 5 and the contact plate 6 are composed of plastic and are produced, for example, using the injection-molding process. As can also be seen from FIG. 4, two mutually diametrically opposite chambers 10, which are open on both sides in the radial direction 37, are integrally formed on the support 5. The chambers 10 are used to hold in each case one brush holder 9, only one brush holder 9 being shown in FIG. 4. In this arrangement, a retaining hook 11 which is integrally formed on the chamber 10 engages by means of a pin 38 in a recess 12 on the brush holder 9, in order to secure it in the chamber 10. The carbon brush 34 is in turn arranged in the brush holder 9 and slides subject to spring pressure on the commutator 3 of the electric motor when the component 1 is mounted on the electric motor. Since the chamber 10 is open in the radial direction 37, it is possible to replace the brush holder 9 together with the carbon brush 34 when the component 1 is in the installed state on the electric motor, without any further dismantling of the component 1 being necessary.

Figure 1:
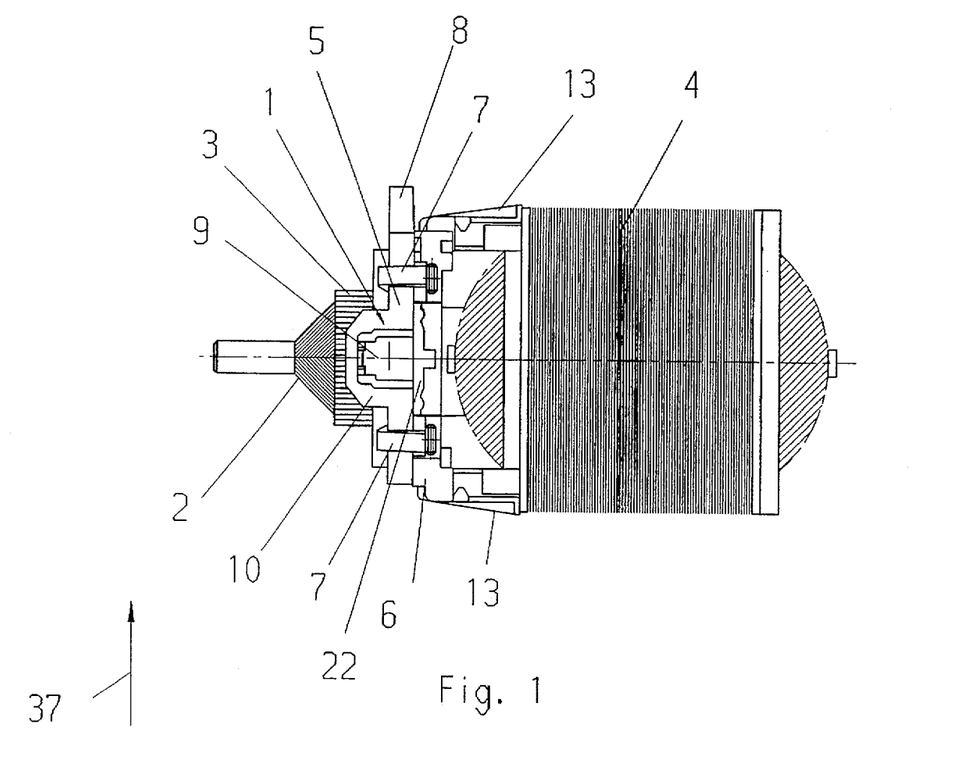
FIG. 1 shows a side view of an apparatus, which is arranged on an electric motor, for adjusting carbon brushes.

In consequence, swiveling of the support 5 by means of the handle 8 leads to the carbon brushes 34 swiveling on the commutator 3 as can be seen, for example, from FIG. 1. At the same time, when the support 5 is swiveled, a changeover takes place between the two rotation directions of the electric motor. The contact system for this changeover switch is furthermore located in the component 1, for this purpose. The contact system comprises fixed contacts and switching contacs, the fixed contacts being electrically connected to the field windings on the stator 4, and the switching contacts being electrically connected to the carbon brushes 34 in the brush holder 9. The fixed contacts interact with the switching contacts as mating contacts in alternate contact with the carbon brushes 34 in order to reverse the rotation direction of the electric motor when the support 5 is swiveled on the contact plate 6. It is intended to explain the design of the contact system in more detail in the following text.

The fixed contacts comprise two contact strips 19, only one of which is shown in FIG. 4. The contact strip 19 has end sections, which are used as contact surfaces 14 for the fixed contacts and are designed elastically in the radial direction 37, so that there are in each case two contact surfaces 14 on each contact strip 19. A groove 20, in which the two contact strips 19 are arranged opposite one another, is located in the contact plate 6, on the side facing the support 5. A contact web 21 originates from each contact strip 19, approximately centrally between the two contact surfaces 14. The contact web 21 is used for the electrical connection of the contact strip 19 to the respective connection 16 for the field winding on the stator 4 of the electric motor. The contact strip 19, the contact web 21 and the connection 16 for the field winding can advantageously be designed as an integral, metallic stamped part.

The brush holder 9, which is located in the chamber 10, is arranged on the support 5 in such a manner that one surface 17 of the brush holder 9 faces the contact plate 6. A part 15 projects from this surface 17. This projecting part 15 projects into the region of the fixed contacts which are located in the groove 20 of the contact plate 6, and is used as a switching contact in order to make direct contact with the contact surfaces 14 on the contact strips 19. The projecting part 15, which is located on the brush holder 9, is preferably approximately at right angles to the surface 17 and thus runs essentially in the axial direction 36. The contact strips 19 are in turn arranged approximately parallel to the projecting part 15 and thus likewise run essentially in the axial direction 36 in the groove 20, the contact surfaces 14 on the contact strip 19 having elasticity approximately in the radial direction 37. In consequence, the switching contacts interact with the fixed contacts essentially in the radial direction 37, in order to make contact. In consequence, a reliable contact is obtained in an advantageous manner, even in the event of vibration and the like, which may occur in particular during use in electric tools.

Figure 5:
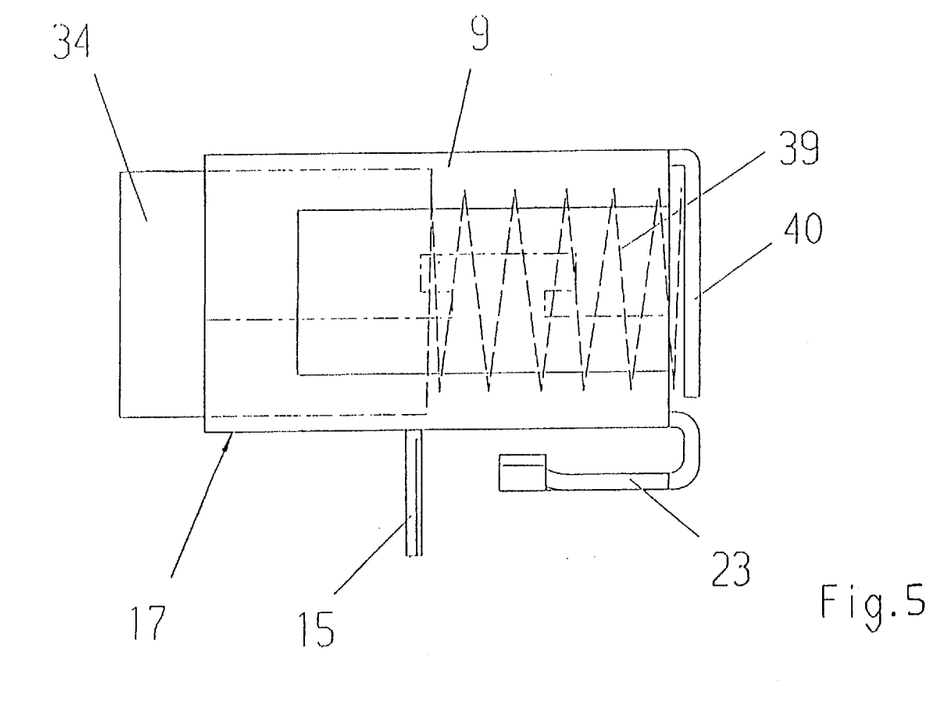
FIG. 5 shows the side view of a brush holder for the carbon brush.

In a particularly preferred manner, the chamber 10 is likewise designed to be open in the axial direction 36, on the side facing the contact plate 6. The surface 17 now represents a free surface 17, which faces the contact plate 6, when viewed in the direction of the support 5. The brush holder 9 is produced from metal, for example from copper, so that the free surface 17 is composed of electrically conductive material. The part 15 can, for example, be cut out of the free surface 17 and can be bent away from the free surface 17 integrally, as can be seen in particular from FIG. 5. As can also be seen from FIG. 5, the electrical connection between the projecting part 15, which acts as a switching contact, and the carbon brush 34 is produced via the surface 17. A compression spring 39, which acts on the carbon brush 34 and is supported on the rear wall 40 of the brush holder 9, is located in the brush holder 9 in order to produce the force in the radial direction 37 by means of which the carbon brush 34 rests against the commutator 3 of the electric motor.

Figure 6:
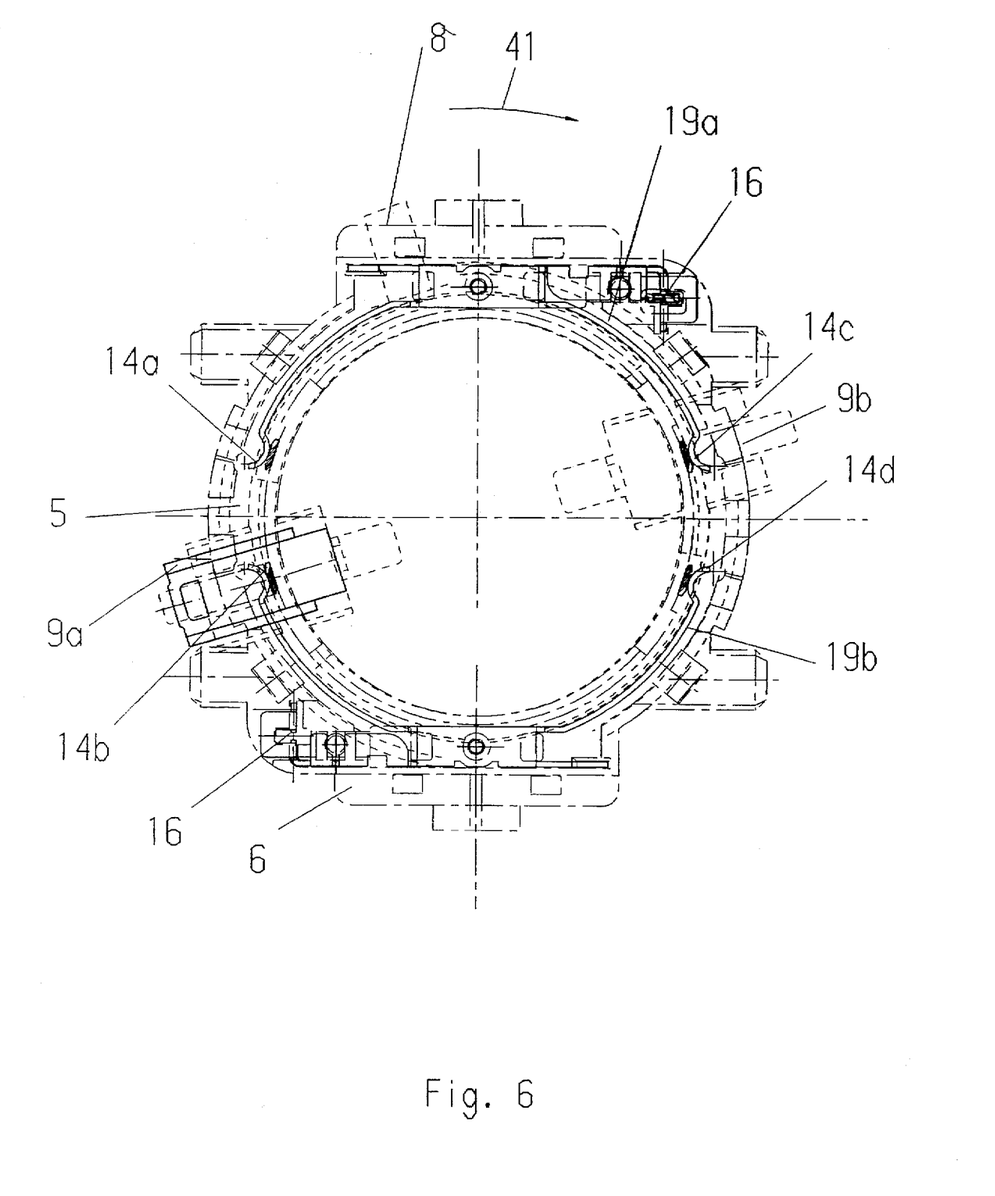
FIG. 6 shows an illustration, as in FIG. 2, according to the further embodiment, but opened up in such a manner that the contact system can be seen.

The switch positions of the component 1 which are used to change over the rotation direction of the electric motor and are adjustable during swiveling of the support 5 on the contact plate 6 by means of the interaction of the projecting parts 15 on the two brush holders 9 as switching contacts and of the respective contact surfaces 14 of the two contact strips 19 as fixed contacts can be seen in more detail in FIG. 6. There, to improve clarity, the brush holders 9 which are in each case present in pairs are designated in more detail by the reference symbols 9a, 9b, the projecting parts 15 by the reference symbols 15a, 15b, and the contact strips 19 by the reference symbols 19a, 19b. The pairs of contact surfaces 14 are designated in more detail on the contact strip 19a by the reference symbols 14a, 14c and on the contact strip 19b by 14b, 14d. FIG. 6 shows a first switch position which corresponds, for example, to the electric motor running clockwise. In the first switch position, the brush holder 9a makes contact by means of the part 15a with the contact surface 14b on the contact strip 19b, and the brush holder 9b makes contact by means of the part 15b with the contact surface 14c on the contact strip 19a. In order to switch to the second switch position, the handle 8 in FIG. 6 is swiveled to the right in accordance with the arrow 41, so that the brush holder 9a makes contact with the contact surface 14a on the contact strip 19a, and the brush holder 9b makes contact with the contact surface 14d on the contact strip 19b. As can be seen, the contact strips 19a, 19b thus alternately make contact by means of the brush holders 9a, 9b in the two switch positions, as a result of which the polarity of the brush holders 9a, 9b with respect to the connections 16 is in each case reversed.

It is now furthermore expedient to design these two switch positions as latched positions. As is shown in FIG. 4, the latched positions are predominantly defined by the interaction of a latching curve 22, which is located in the contact plate 6, with a latching spring 23 which is connected to the support 5. The latching spring 23 is preferably an element, which is elastic in the axial direction 36, on the surface 17 of the brush holder 9. The latching spring 23 can expediently be designed integrally with the surface 17, as can be seen in particular from FIG. 5.

As can be seen from FIG. 4, the contact system, which comprises the contact surfaces 14 and the projecting parts 15, is largely encapsulated by the component 1. In this arrangement, in particular, a step-shaped rim 18 on the support 5 covers the contact system at the top in the view in FIG. 4. The contact system, which is located in the groove 20, is furthermore covered at the bottom and at the sides by the contact plate 6. This provides good protection against dust ingress or the like in the electric hand-held tool.

The connection 16 for the field winding of the stator 4 is advantageously arranged in a holder 35 on the contact plate 6. In this case, the holder 35 can be designed in such a manner that the connection 16 is exposed on the side of the contact plate 6 facing away from the support 5. In consequence, the electrical connection between the connections 16 and the field windings can be produced at the same time when the component 1 is fitted onto the stator 4 of the electric motor. The connections 16 and the mating connections on the field windings can for this purpose be designed in widely different forms, for example as plug connections, wire connections, sleeve connections or the like. Because of the simplicity of assembly, it is particularly preferred for the connections 16 to be designed in the manner of insulation-piercing terminals 24.

Figure 3:
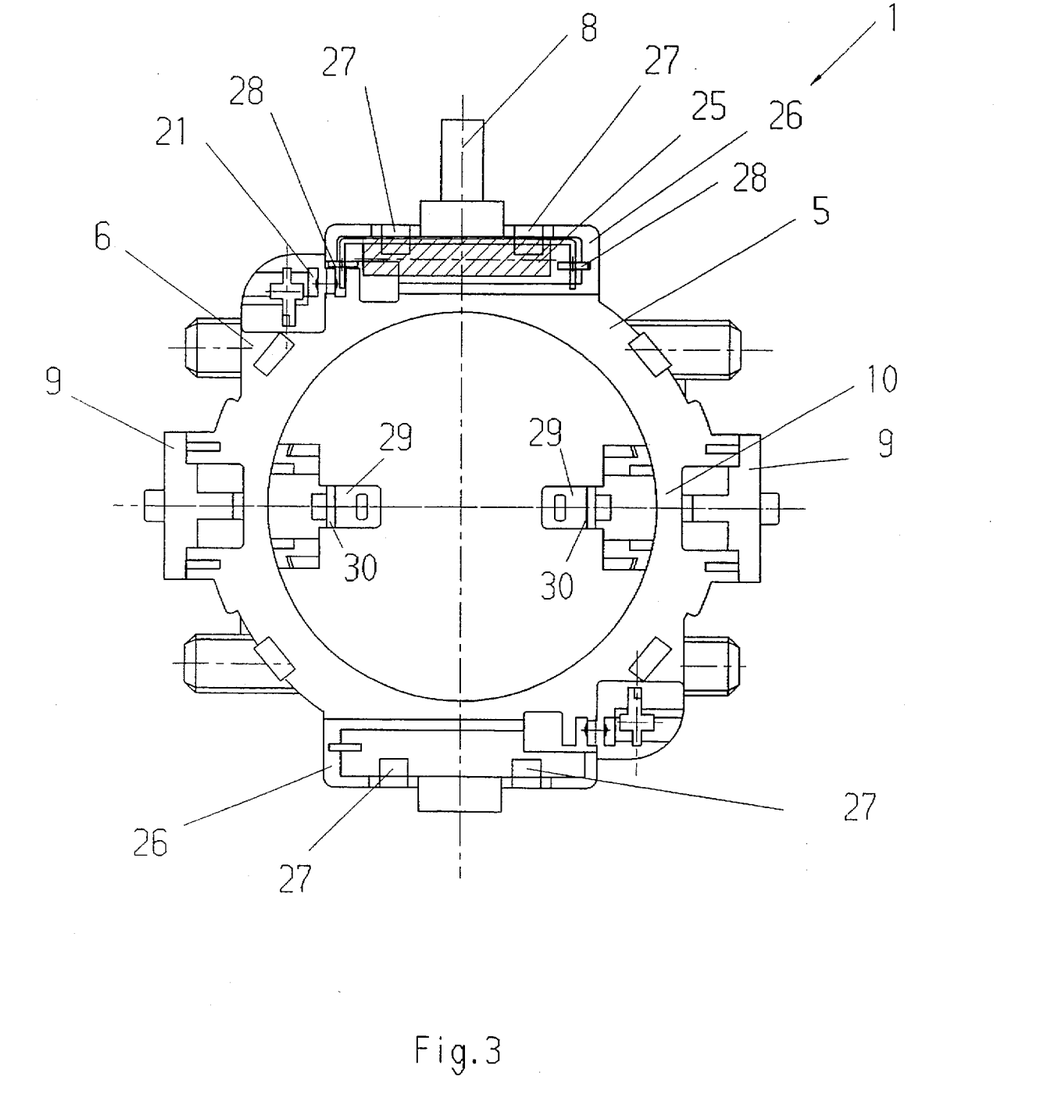
FIG. 3 shows the plan view in the opposite direction to the arrow 36 from FIG. 1 of an apparatus in a further embodiment, the electric motor once again being omitted.

The contact web 21 can furthermore be designed in such a manner that it is possible to make contact with a suppression inductor 35 for the electric motor, as is shown schematically in the illustration in FIG. 3. A holder 26 for the suppression inductor 25 is arranged on the side of the contact plate 6 facing away from the support 5. A clip 27, which is located on the contact plate 6, interacts with this holder 26 in order to retain the suppression inductor 25. This makes retention possible, irrespective of the diameter of the suppression inductor 25. Clamping contacts 28, which are electrically connected to the connections 16 via the contact web 21 and onto which the suppression inductor 25 is plugged are located in the holder 26. The electrical bridge through the contact web 21 between the two clamping contacts 28 can be disconnected subsequently by means of a cutting tool, for example a cutting blade. In consequence, the component 1 can optionally be equipped with or without a suppression inductor 25. If the suppression inductor 25 is used, then the bridging connection on the contact web 21 is disconnected, since the electrical connection to the connections 16 is then produced via the suppression inductor 25.

In general, the component 1 is produced separately and is not fitted to the electric motor until the electric tool is being produced. A retaining element, which can be removed subsequently, is arranged in the region of the chambers 10, for transport security for the carbon brushes 34. At the same time, this retaining element is used as an aid for mounting the component 1 on the electric motor since, in consequence, the carbon brushes 34 cannot collide with parts of the electric motor while the component 1 is being fitted.

Figure 2:
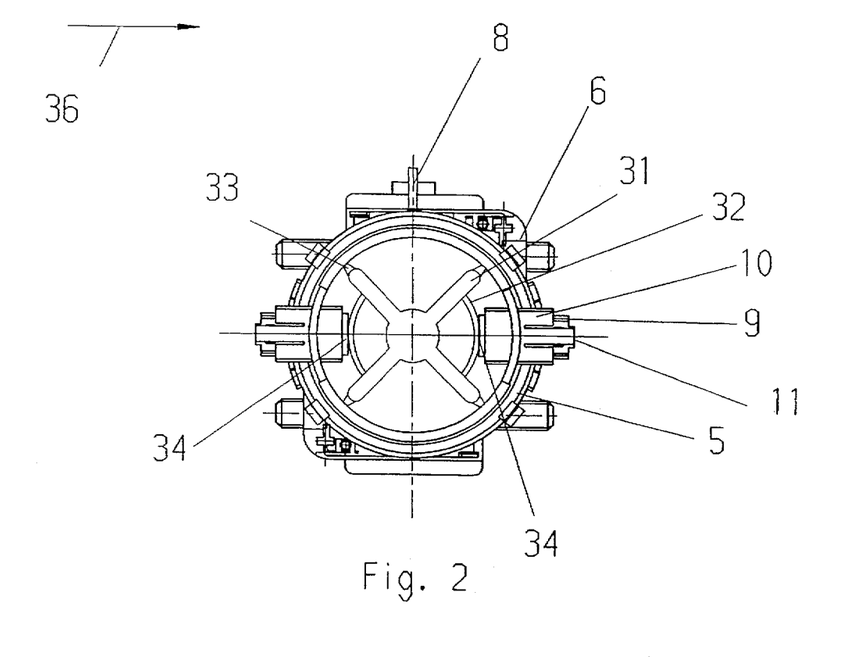
FIG. 2 shows the plan view in the direction of the arrow 36 of the apparatus shown in FIG. 1, without an electric motor.

In a first exemplary embodiment according to FIG. 2, the retaining element comprises webs 31 which are arranged in a star shape and are integrally molded onto the support 5. Retaining surfaces 32 are mounted between the webs 31 in the region of the brush holders 9 which are located in the chambers 10, so that the carbon brushes 34 are held back in the brush holder 9. After the component 1 has been mounted on the electric motor, the webs 31 are broken off and removed at the molding attachment points 33, so that the carbon brushes 34 rest against the commutator 3 of the electric motor as a result of the spring pressure applied by the compression spring 39. If necessary, the webs 31 can be broken off at the molding attachment points 33 after insertion of the brush holders 9 together with the carbon brushes 34 into the chambers 10, since, in this case, the webs 31 are still resting in a supporting manner on the support 5 for transport security. The webs 31, with the retaining surfaces 32, are then pushed out of the support 5 by the electric motor itself when the component 1 is being mounted on the electric motor.

In a further exemplary embodiment, which is shown in FIG. 3, the retaining element comprises individual retaining lugs 29, which are located on the chamber 10 and hold the carbon brush 34 back in the brush holder 9 by means of a pin 30. After assembly, the retaining lugs 29 are broken off, so that the carbon brushes 34 emerge from the brush holder 9 under the influence of a compression spring 39 or the like, and rest against the commutator 3 of the electric motor.

The invention is not limited to the exemplary embodiments described and illustrated. In fact, it also covers all developments recognized by a person skilled in the art within the context of the essence of the invention. The apparatus according to the invention for adjusting carbon brushes can thus be used not only for electric tools but also on other equipment with electric motors, for example in kitchen equipment or the like.

What is claimed is:

1. An apparatus for adjusting carbon brushes of a reversible electric motor, the apparatus having an axial direction and a radial direction and comprising:

a swivelable support;

a fixed position contact plate disposed adjacent the support;

a plurality of fixed contacts received in the contact plate and adapted to be electrically connected to field windings of the electric motor; and a plurality of brush holders arranged on the support for holding the carbon brushes, each of the brush holders having a facing surface which faces the contact plate, each of the brush holders further including a projecting portion projecting approximately perpendicularly from the facing surface in the axial direction into a region of the fixed contacts, projecting portions of the brush holders thereby forming switching contacts for making direct contact with the fixed contacts such that the fixed contacts are adapted to be in alternate contact with the carbon brushes for reversing a direction of rotation of the electric motor when the support is swiveled, each of the fixed contacts having a contact surface extending approximately parallel to a corresponding switching contact in the axial direction, the contact surface further having elasticity the radial direction such that the corresponding switching contact is directly urged against the contact surface in the radial direction for establishing direct electrical contact between the fixed contacts and the brush holders.

2. The apparatus according to claim 1, wherein the facing surface of each of the brush holders is made of an electrically conductive material and is a free surface.

3. The apparatus according to claim 1, further comprising assembly means disposed on the support and on the contact plate for assembling the support and the contact plate with one another for forming a flat component therewith adapted to be fitted onto a stator of the electric motor in the axial direction and to surround the commutator as a ring in the radial direction, the assembly means including one of snap-on hooks and guide hooks, the support further including a step shaped rim covering the contact plate such that the fixed contacts and the switching contacts are encapsulated by the flat component.

4. The apparatus according to claim 1, wherein each of the fixed contacts comprises a contact strip having a connection component thereon for electrical connection to the field windings of the electric motor, the contact surface of said each of the fixed contacts being formed by an elastic end section of the contact strip, the contact plate defining a groove therein on a side thereof facing the support for holding the contact strip therein.

5. The apparatus according to claim 4, wherein:

the respective contact strips comprise two contact strips;

the contact surface of said each of the fixed contacts is a first contact surface, said each of the fixed contacts comprising a second contact surface, the first contact surface and the second contact surface being formed by two elastic ends of a corresponding one of the two contact strips; the apparatus further comprising a contact web disposed approximately centrally between the first contact surface and second contact surface on the corresponding one of the two contact strips for electrically connecting the corresponding one of the contact strips to a corresponding connection component, the corresponding one of the two contact strips, the connection component and the contact web being stamped integrally with one another.

6. The apparatus according to claim 1, wherein:

the projecting portion is formed integrally with the facing surface and is bent away therefrom; and the contact plate defines a groove therein on a side thereof facing the support for holding the contact strip therein; and the fixed contacts are arranged running in the axial direction in the groove.

7. The apparatus according to claim 1, further comprising a latching arrangement including:

a latching curve defined on the contact plate; and a latching spring elastic in the axial direction and formed integrally with the facing surface of said each of the brush holders, the latching spring being adapted to cooperate with the latching curve for defining latched positions of the support in its swiveling motion for establishing alternate contact between the switching contacts and the fixed contacts.

8. The apparatus according to claim 1, wherein:

the support defines a plurality of chambers, each of the chambers being open on both sides thereof in the radial direction for holding a corresponding one of the brush holders therein, and further being open in the axial direction on a side of the support facing the contact plate;

the support further includes a retaining hook integrally formed on a wall of the chamber; and the corresponding one of the brush holders defines a recess therein adapted to be engaged by the retaining hook for securing the corresponding one of the brush holders in said each of the chambers.

9. The apparatus according to claim 8, further comprising removable retaining elements for holding the carbon brushes back in respective ones of the brush holders for transport and security and as an aid for mounting the support on the electric motor, the retaining elements comprising:

retaining lugs integrally formed on walls of the chamber; and webs supported on the support and having retaining surfaces attached thereto.

10. The apparatus according to claim 4, wherein connection components of the fixed contacts are configured to be insulation-piercing and comprise one of terminals, plugs, wires and sleeves, the connection components further being exposed on a side of the contact plate facing away from the support such that an electrical connection between the connection components and the field windings is made when the contact plate is fitted on a stator of the electric motor.

11. The apparatus according to claim 4, further comprising:

a holder for a suppression inductor arranged on a side of the contact plate facing away from the support;

a clip disposed on the contact plate and cooperating with the holder for holding the suppression inductor irrespective of a diameter thereof; and clamping contacts electrically connected to the connection components and disposed on the holder, the clamping contacts being adapted to be plugged onto by the suppression inductor and further being configured such that a bridging electrical connection therebetween is disconnectable irrespective of whether the suppression inductor is plugged therein.

12. An apparatus for adjusting carbon brushes of a reversible electric motor, the apparatus having an axial direction and a radial direction and comprising:

a swivelable support;

a fixed position contact plate disposed adjacent the support;

a plurality of fixed contacts received in the contact plate and adapted to be electrically connected to field windings of the electric motor; and a plurality of brush holders arranged on the support for holding the carbon brushes, each of the brush holders having a facing surface which faces the contact plate, the brush holders further including respective projecting portions forming switching contacts for making direct contact with the fixed contacts such that the fixed contacts are adapted to be in alternate contact with the carbon brushes for reversing a direction of rotation of the electric motor when the support is swiveled, wherein:

the support defines a plurality of chambers, each of the chambers being open on both sides thereof in the radial direction for holding a corresponding one of the brush holders therein, and further being open in the axial direction on a side of the support facing the contact plate.

13. The apparatus according to claim 12, wherein:

the support further includes a retaining hook integrally formed on a wall of the chamber; and the corresponding one of the brush holders defines a recess therein adapted to be engaged by the retaining hook for securing the corresponding one of the brush holders in said each of the chambers.

* * * * *